INVENTORS.
BERNARD WILLIAM COOPER
JEROME RUBLER
BY Bierman & Bierman
ATTORNEYS

INVENTORS.
BERNARD WILLIAM COOPER
JEROME RUBLER
BY Bierman + Bierman

ATTORNEYS

United States Patent Office 3,435,511
Patented Apr. 1, 1969

3,435,511
METHOD OF MAKING X-RAY CASSETTE
Bernard William Cooper, Syosset, and Jerome Rubler, Roslyn Heights, N.Y., assignors to Spectronics Corporation, Westbury, N.Y., a corporation of New York
Filed Jan. 11, 1966, Ser. No. 519,852
Int. Cl. B23k 31/02
U.S. Cl. 29—476                                    1 Claim

ABSTRACT OF THE DISCLOSURE

A method of reinforcing cassettes used for holding X-ray films by placing reinforcing inserts into the hollow, box-like mitered corners. Thereafter, the insert is welded to the box-like elements and the mitered fitting is welded.

---

The present invention is directed to the making of cassettes, and more particularly to the construction of the corners thereof to guard against accidental damage thereto.

Cassettes have been in use for a great many years in holding X-ray films for convenience in taking X-ray photographs. Such cassettes or frames are subject to considerable abuse and they are often dropped accidentally, resulting in distortion of the cassettes so that it becomes difficult to properly insert the film and to fit the cassette into the Bucky or other appliance. It had become common to fabricate the cassette in order to strengthen it by welding together the corners, such as by heliarc welding. While the product was in most particulars satisfactory for use, this method of welding was tedious, requiring expert craftsmen; it was also time-consuming. The expense of the welding operation was considerable and it greatly increased the production cost of the cassette.

The present invention is intended and adapted to overcome and avoid the disadvantages and difficulties inherent in prior methods of producing cassettes, it being among the objects thereof to devise a method of joining the corners of a cassette which is simple, inexpensive and effective.

It is also among the objects of the invention to devise a method which will so strengthen the corners of a cassette that it may be dropped from a substantial height onto a hard surface or floor without damage thereto.

It is further among the objects of the invention to provide a method which does not require highly skilled craftsmen, which is rapid, and which lends itself to precise and reproducible results, and which produces a strong cassette.

In practising the invention there are provided frame elements which are preferably hollow and box-like in cross-section in order to provide a light yet highly rigid product. To form a corner, the ends of adjacent elements are cut to angles of 45° and a metal insert is fastened in the inside of one of the meeting elements at the corner, said insert extending therefrom and projecting into the end of the adjacent element. The assembly is then subjected to flash welding forming a solid reinforced corner which, together with the hollow structure, distributes the stresses caused by rough handling or dropping of the cassette, and prevents thereto.

The metal insert may be fastened into one or both ends of a frame element, and after four such elements have been assembled, the flash welding quickly and effectively produces the final product. Initially the metal insert may be secured in the element by various means such as by welding, by inserting nails or screws, by pressure fit into the element or by other mechanical means.

In an alternative method, the frame is assembled and the corners thereof are flash welded together. Then a metal or non-metal is introduced into the corners of the frame through slots formed in the frame adjacent to the corners thereoef. Such introduction is accomplished by flowing the material in molten form through said slots into the corners and allowing the material to solidify or to set. Among such materials are lead, lead alloys, fusible bearing metal alloys, sintered or powdered metals, plastic materials such as epoxy resins, and vulcanizable rubber or synthetic compositions.

In the accompanying drawing constituting a part hereof and in which like reference characters indicate like parts and in which—

Figure 1:
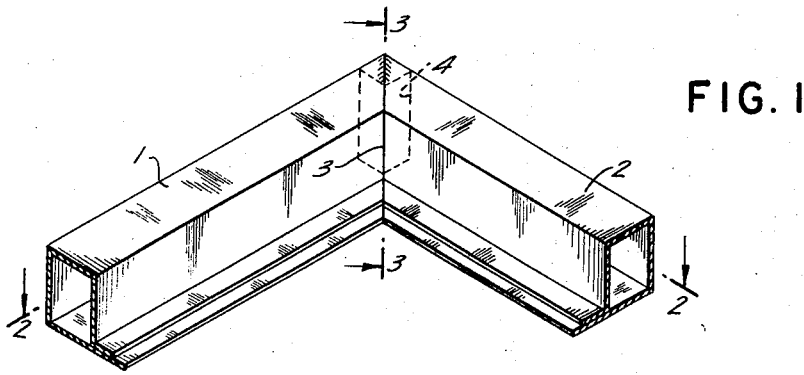
FIG. 1 is a perspective view of a corner of a cassette embodying the present invention.
Figure 2:
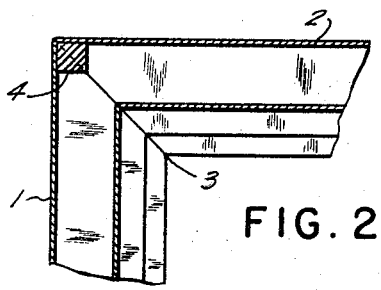
FIG. 2 is a horizontal cross-sectional view taken along line 2—2 of FIG. 1.
Figure 3:
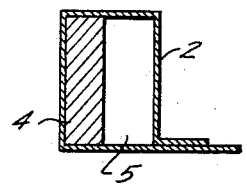
FIG. 3 is a transverse cross-sectional view taken along line 3—3 of FIG. 1.

Referring to FIGS. 1–3, the corner of the cassette is made up of hollow box-like pieces cut at a 45° angle and fitted and welded together at 3. Before fitting together a block or body 4 is inserted into one or the other of elements 1 and 2, and held in place as by friction, after which the corner is flash welded. The body 4 fills only a part of the hollow space leaving a volume 5 free of said body, which is usually of metal.

Figure 4:
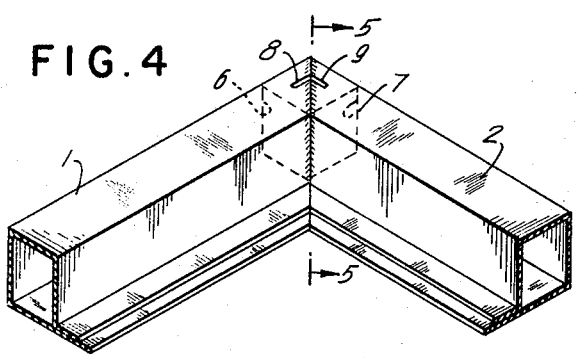
FIG. 4 is a view similar to FIG. 1 showing a modified form of the invention.
Figure 5:
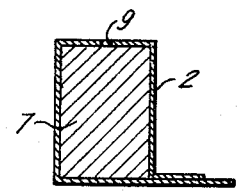
FIG. 5 is a transverse cross-sectional view taken along line 5—5 of FIG. 4.

In FIGS. 4 and 5, the insert or body fills the whole volume of the hollow frame. Body 6 fits into corner piece 1 and body 7 fits into corner piece 2, being held in place by pins 8 and 9, respectively, passing through the corners and being embedded in the bodies.

Figure 6:
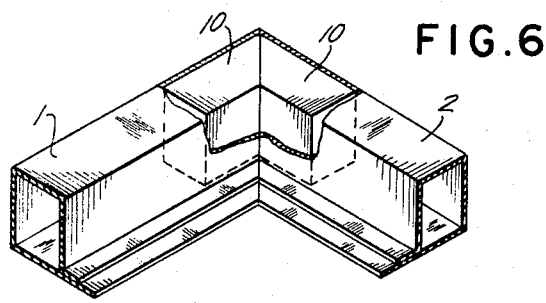
FIG. 6 is a view similar to FIG. 1, showing a further modified form of the invention.

Referring to FIG. 6, the body 10 is angular and corners 1 and 2 are fitted over body 10 until they meet, after which the corner pieces and body are flash welded together.

Figure 7:
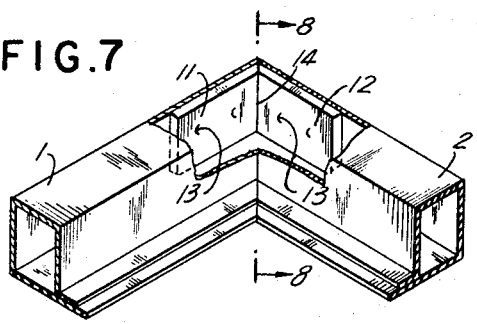
FIGS. 7 and 8 are a perspective view of a corner and a transverse cross-sectional view, respectively, of a further modification of the invention.
Figure 8:
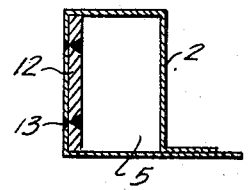

Referring to FIGS. 7 and 8, a flat piece 11 of metal or other reinforcing material is inserted in corner piece 1 and a similar corner piece 12 is inserted in corner piece 2. As shown at 13, said pieces are spot welded to the corner pieces. Then said pieces are fitted together and butt welded at 14.

Figure 9:
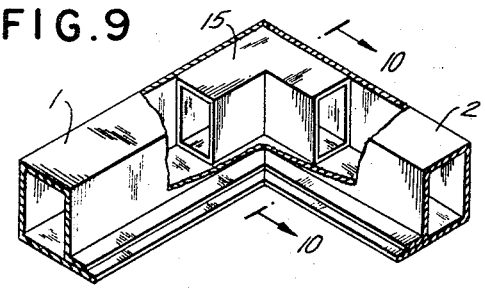
FIGS. 9 and 10 are views similar to FIGS. 7 and 8 showing still another modified form of the invention.
Figure 10:
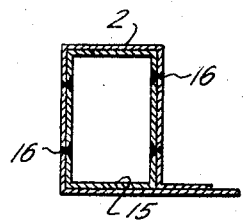

Referring to FIGS. 9 and 10, insert 15 is an angular tube, the size of which is such as to fit snugly into the box-like frame member. Insert 15 is spot welded to the frame member 2 as indicated at 16. Then corner piece 1 is slipped over insert 15 until it touches corner piece 2, after which the corner pieces are flash welded together.

Figure 11:
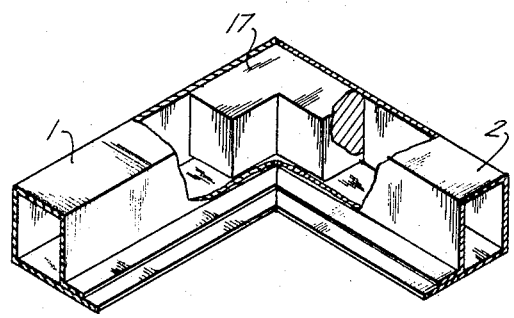
FIG. 11 is a view similar to FIG. 1 showing another modification of the invention.

In FIG. 11 is shown an insert 17 which is a solid body as contrasted to the hollow member 15 shown in FIG. 9. It may be fitted into the corner pieces and temporarily held there by friction. The assembly is then flash welded.

Figure 12:
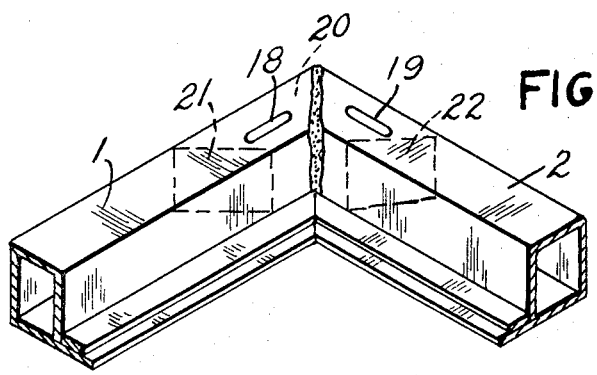
FIG. 12 is a view similar to FIG. 1 showing another modification of the invention.

Referring to FIGURE 12, the frame is assembled and the corners thereof are flash-welded together. As shown, the elements 1 and 2 are flash-welded at a corner. Then a metal or a non-metal is introduced into each corner of the frame through slots 18 and 19 formed in the frame adjacent to the corners thereof. Such introduction is accomplished by flowing the material in molten form through the slots into each corner and allowing the material to solidify or to set. Materials which may be used include lead, lead alloys, fusible bearing metal alloys, sintered or powdered metals, plastic material, such as epoxy resins, and vulcanizable rubber or synthetic compositions. The solidified material is indicated as 20 in FIGURE 12 and has end faces 21 and 22 which may have a rough surface.

Although the invention has been described with the disclosure of several specific embodiments thereof, they are intended to illustrate the invention, but not to limit it. Other forms of the corner arrangements are possible, in view of which the invention is not to be limited except by the character of the claim appended hereto.

What is claimed is:

1. A method of forming the corners of an X-ray cassette frame which comprises forming frame elements which are box-like in cross-section and have upper, lower, inner and outer walls, mitering the ends of the elements, welding the mitered ends of the elements, forming slots adjacent the corners of the frame elements, and introducing a fusible material into a mitered corner of the frame elements through the slots formed adjacent the corner of the frame elements, causing said fusible material to set in a corner of said frame elements, and repeating the foregoing steps for each of the corners of said cassette.

References Cited

UNITED STATES PATENTS

| | | | |
|---|---|---|---|
| 2,464,514 | 3/1949 | Kaufmann | 29—476 X |
| 2,764,314 | 9/1956 | Mautner | 220—84 |
| 3,030,673 | 4/1962 | London | 52—616 X |
| 3,105,274 | 10/1963 | Armstrong | 52—398 |
| 3,183,560 | 5/1965 | Brichard. | |

JOHN F. CAMPBELL, *Primary Examiner.*

J. L. CLINE, *Assistant Examiner.*

U.S. Cl. X.R.

29—455; 52—616